United States Patent [19]

Ojima et al.

[11] Patent Number: 5,138,746
[45] Date of Patent: Aug. 18, 1992

[54] CLAMP STRUCTURE

[75] Inventors: Juji Ojima, Aikawa; Isao Hino, Komagane, both of Japan

[73] Assignee: NKH Spring Co., Ltd., Yokohama, Japan

[21] Appl. No.: 676,803

[22] Filed: Mar. 28, 1991

[30] Foreign Application Priority Data

| Apr. 6, 1990 | [JP] | Japan | 2-90291 |
| Apr. 6, 1990 | [JP] | Japan | 2-90292 |
| Apr. 6, 1990 | [JP] | Japan | 2-90293 |
| Dec. 6, 1990 | [JP] | Japan | 2-400717 |

[51] Int. Cl.$^5$ .......... B65D 63/02; F16L 33/02
[52] U.S. Cl. .......... 24/20 R; 24/20 EE; 24/20 CW
[58] Field of Search .......... 24/20 R, 20 W, 20 EE, 24/20 S, 20 TT, 20 CW, 20 LS, 23 W, 23 EE

[56] References Cited

U.S. PATENT DOCUMENTS

| 4,492,004 | 1/1985 | Oetiker | 24/20 R |
| 4,712,278 | 12/1987 | Oetiker | 24/20 W |
| 4,742,600 | 5/1988 | Calmettes et al. | 24/20 R |
| 4,914,788 | 4/1990 | Ojima | 24/20 R |
| 4,991,266 | 2/1991 | Oetiker | 24/20 R |

*Primary Examiner*—Victor N. Sakran
*Attorney, Agent, or Firm*—Frishauf, Holtz, Goodman & Woodward

[57] ABSTRACT

A clamp structure having a metal band body is mountable on a surface to be clamped. Small projections rising substantially vertically are formed on an inner lap portion of the metal band body. Receiving holes having an edge portion engageable with the projections are formed in an outer lap portion of the metal band body. A first tool receiving portion is formed on the outer lap portion of the body. A second tool receiving portion and a terminal holding portion are provided on an intermediate portion positioned in the longitudinal direction of the metal band body. The terminal holding portion has an opening for receiving the first end of the body when the projections are inserted into the receiving holes to fasten the metal band body. A temporary attaching means having a passage provided between the terminal holding portion and the projections temporarily attaches the metal band body by constraining the outer and inner portions to be engaged with each other when the metal band body is being fastened.

11 Claims, 16 Drawing Sheets

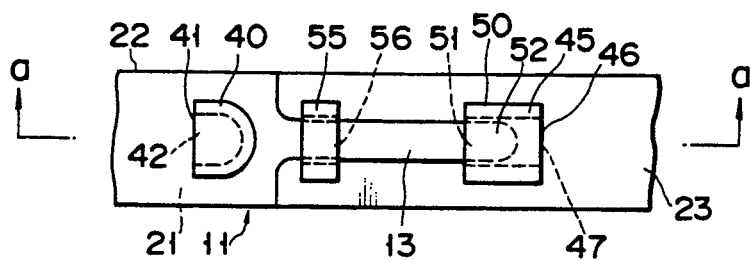
F I G. 12
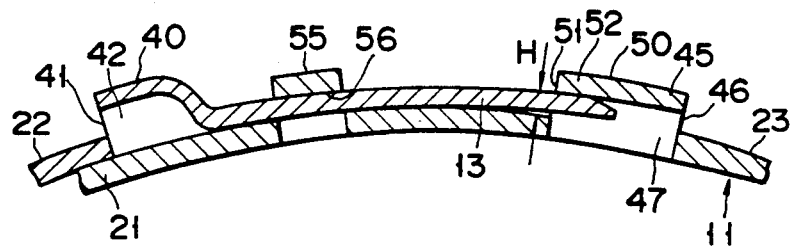
F I G. 13
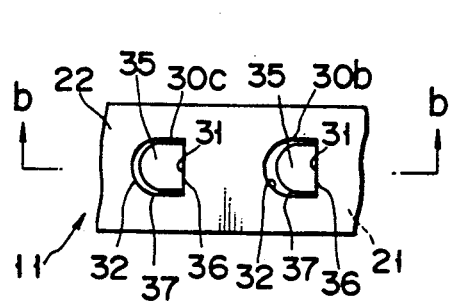
F I G. 14
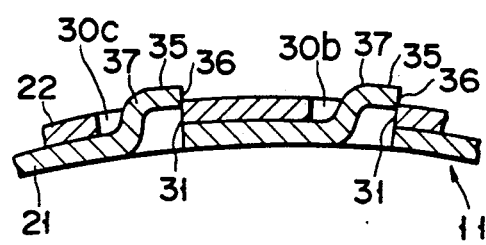
F I G. 15

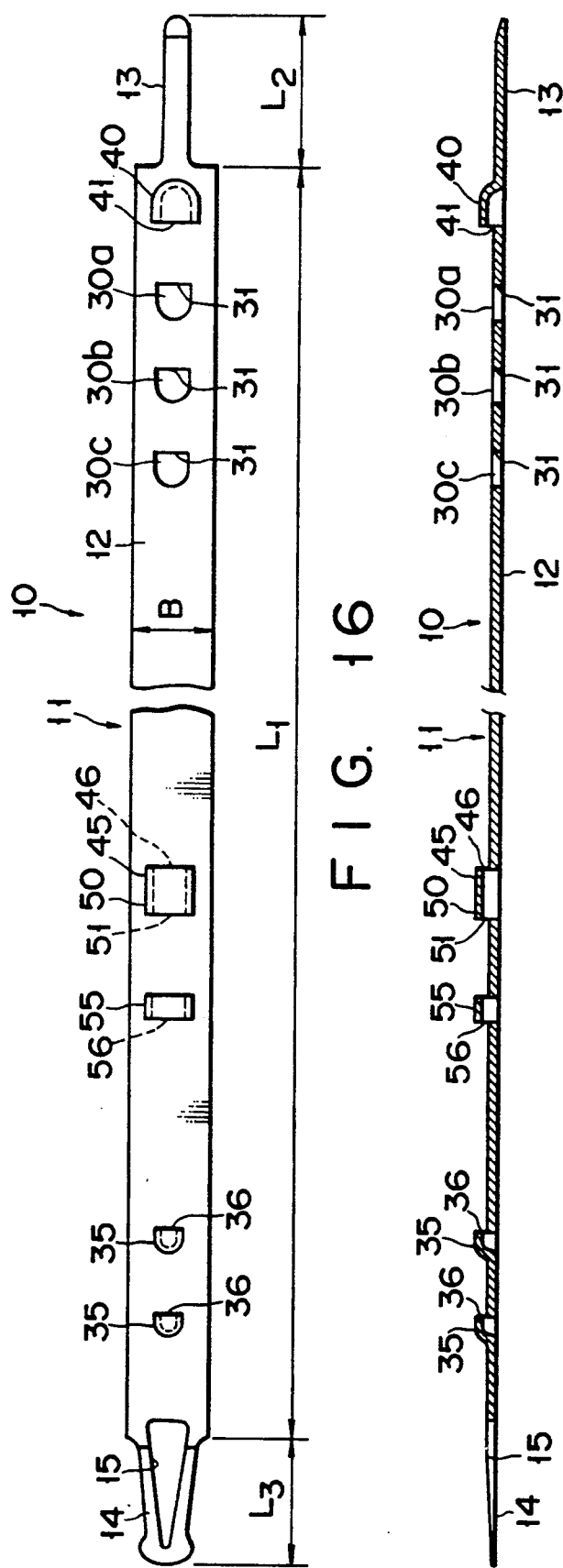

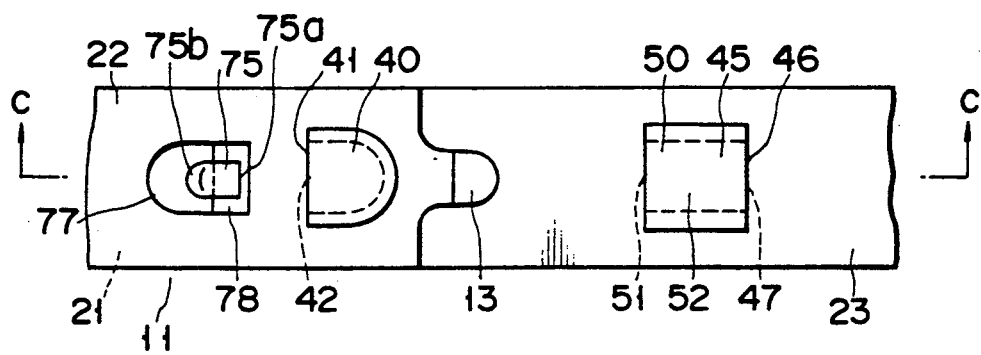
F I G. 20
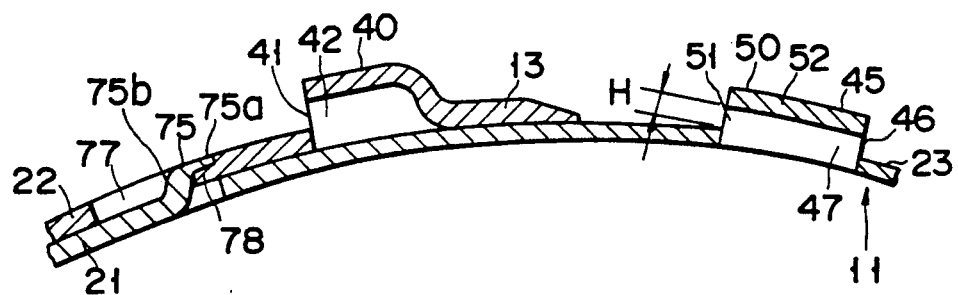
F I G. 21

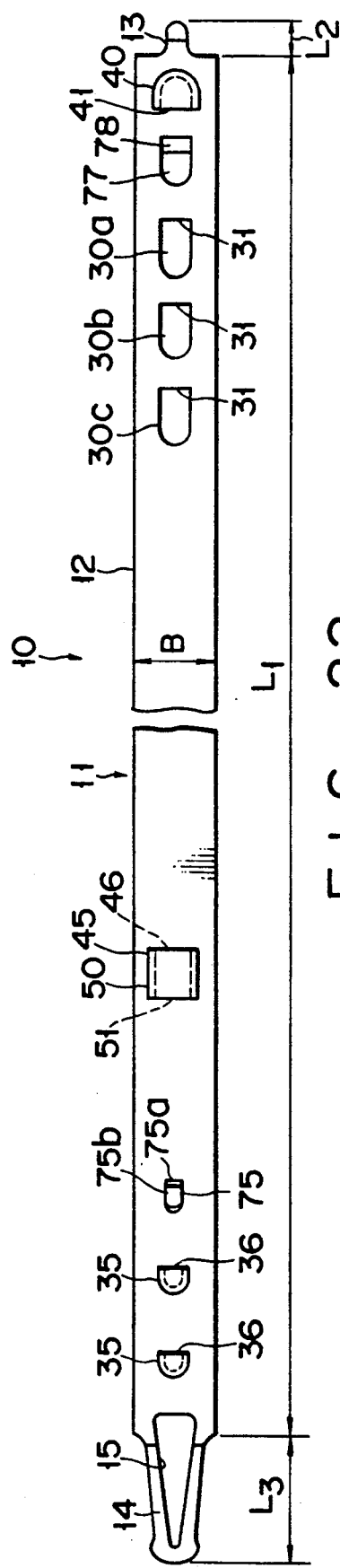
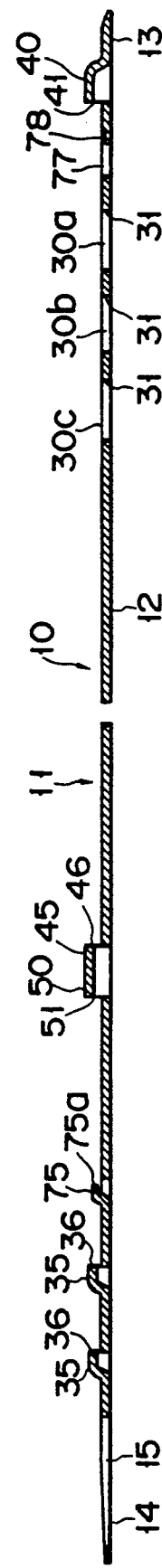
FIG. 22
FIG. 23

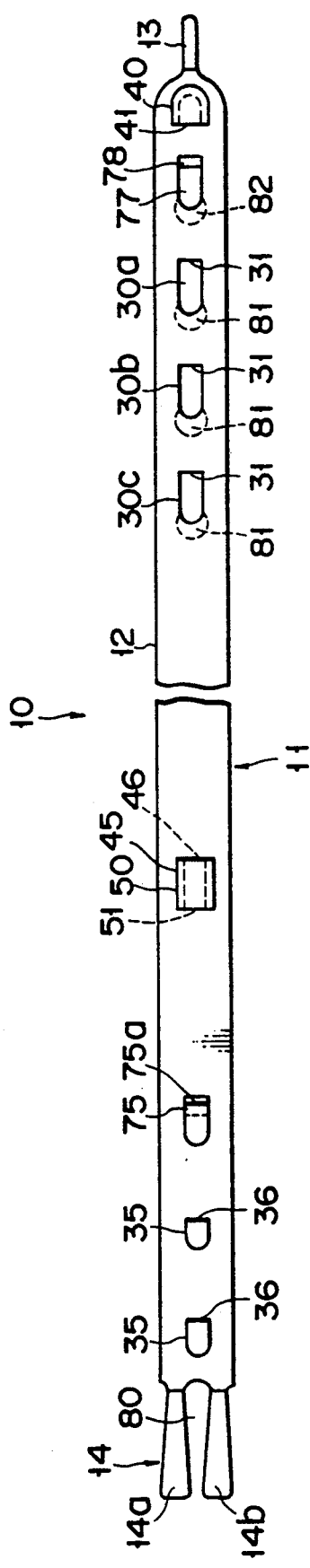
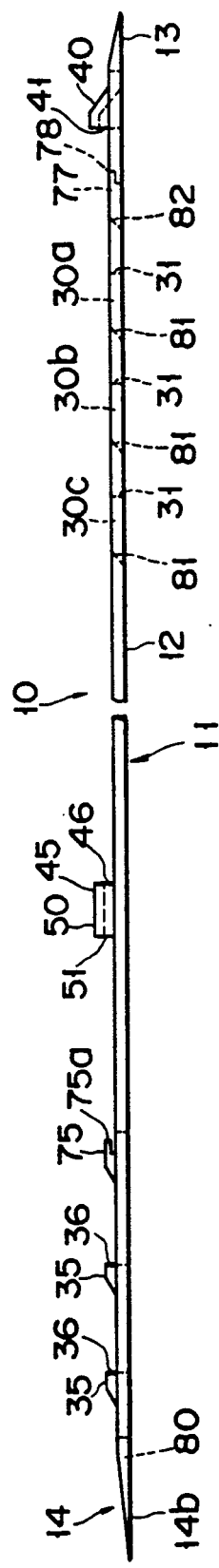
FIG. 29
FIG. 30

CLAMP STRUCTURE

BACKGROUND OF THE INVENTION

1. Field of the Invention

The present invention relates to a clamp structure, which is used to fix a hose or rubber boot or the like to a cylindrical member.

2. Description of the Related Art

Conventionally, a hose clamp comprises a metal band body having both ends. The body comprises a hook, a receiving hole with which the hook is engaged, and an ear portion for clamping. The body is formed like a ring. To fix the clamp to a surface to be clamped, after the hook is engaged with the receiving hole, the ear portion is deformed by a tool. Thereby, the circumferential length of the body contacting the surface to be clamped becomes short, so that the body can be fixed to the surface to be clamped in a state that the body is fastened.

In the other conventional clamp, there are provided a metal band body having both ends, a hook, a receiving hole, and a pair of tool receiving portions. To fix the clamp to the surface to be clamped, the paired tool receiving portions are pulled toward the direction where both tool receiving portions are close to each other by a tool such as a nipper. If the body is fastened in this manner, the hook enters the predetermined receiving hole, thereby the body is fixed to the surface to be clamped. In this case, in order to prevent the hook from being detached from the receiving hole, a front surface wall of the hook is shaped to be overhung.

In the above-mentioned prior arts, there were problems as follows.

In the case of the first prior art, since the ear portion largely protrudes from the outer surface of the body, unfavorably the ear portion often contacts the surrounding members. Moreover, if spring back is generated in the ear portion after the ear portion is deformed by the tool, suitable clamping force cannot be maintained. In the clamp tool having an ear portion, since a weight distribution in the body circumferential direction largely inclines to one side, clamping force inclines to one side when the clamp is rotated at a high speed.

In the case of the second prior art, when the hook is inserted into the receiving hole, the body moves in a direction such that the body is slightly loosened due to the slack created by the overhang of the front surface wall of the hook. This is disadvantageous in terms of exerting a strong clamping force.

In the above-mentioned prior arts, an outer lap portion of the body and an inner lap portion are easily separated until the body is fixed to the surface to be clamped. Due to this, it is difficult for the body to be temporarily attached to the surface to be clamped.

SUMMARY OF THE INVENTION

An object of the present invention is to provide a clamp structure wherein suitable clamping force can be maintained without providing a conventional large protruding ear-like portion, and wherein a projection can be surely engaged with an edge portion of a receiving hole. Another object of the present invention is to provide a clamp structure wherein a temporary attachment of the body to a surface to be clamped can be easily made According to the clamp structure of the present invention, a terminal holding portion is provided, thereby preventing the outer lap portion of the body from being separated from the inner lap portion. Moreover, since the clamp structure of the present invention does not need the conventional large protruding ear-like portion, the weight distribution in the circumferential direction of the body is substantially equal. Due to this, the clamp structure of the present invention can maintain strong clamping force, and can be easily and temporarily attached to a surface to be clamped.

A first clamp structure of the present invention comprises a metal band body having a main part, a first end, and a second end, said body having an inner lap portion, an outer lap portion, and an intermediate portion connected to both inner and outer lap portions in a state that said body is formed in a ring-like shape, with said second end located inside; a small projection formed on the inner lap portion, projecting toward the outer lap portion, and having a front surface wall directed to the first end of the body; a receiving hole formed in the outer lap portion, and having an edge portion being able to engage with the front surface wall of the projection; a first tool receiving portion formed near the first end of the body and having a first rising wall; a second tool receiving portion formed on the intermediate portion of the body, and having a second rising wall pairing with the first tool receiving portion; and a terminal holding portion for holding the first end of the body having an opening for receiving the first end in a state that the projection is inserted into the receiving hole, and a terminal holding wall for holding the first end not to be separated from the inner lap portion.

The body of the clamp structure of the present invention is wound around a surface to be clamped. If the first and second tool receiving portions of the body are pulled by a tool toward a position where both tool receiving portions are close to each other, the projection is inserted into a predetermined receiving hole. Due to this, the clamp structure is actually fixed to the surface to be clamped. At this time, since the first end of the body enters the terminal holding portion, so that the first end is held, the outer lap portion is not separated from the inner lap portion.

In a second clamp structure of the present invention, temporary attaching means is added to the construction of the above-mentioned first clamp structure. The temporary attaching means constrains both outer and inner lap portions not to be separated from each other when the body is rounded to some extent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below serve to explain the principles of the invention.

FIG. 12 is a plane showing the clamp of FIG. 11 near the terminal holding portion;

FIG. 13 is a cross sectional view taken on line of a—a in FIG. 12;

FIG. 14 is a plane showing a projection and a receiving hole of the clamp shown in FIG. 11;

FIG. 15 is a cross sectional view taken on line of b—b in FIG. 14;

FIG. 16 an expanded plane of the clamp shown in FIG. 11;

FIG. 17 is an expanded cross sectional view of the clamp shown in FIG. 11;

FIG. 20 is a plane showing the clamp of FIG. 19 near the terminal holding portion;

FIG. 21 is a cross sectional view taken on line of c—c in FIG. 20

FIG. 22 is an expanded plane of the clamp shown in FIG. 19;

FIG. 23 is a expanded cross sectional view of the clamp shown in FIG. 19;

FIG. 26 is a cross sectional view taken on line of e—e in FIG. 27;

FIG. 29 is a plane showing a state that a clamp of a fourth embodiment of the present invention is expanded; and FIG. 30 is a side view showing the clamp in FIG. 29.

DETAILED DESCRIPTION OF THE PREFERRED EMBODIMENTS

The first embodiment of the present invention will be explained with reference to FIGS. 1 to 9.

Figures 6, 7:
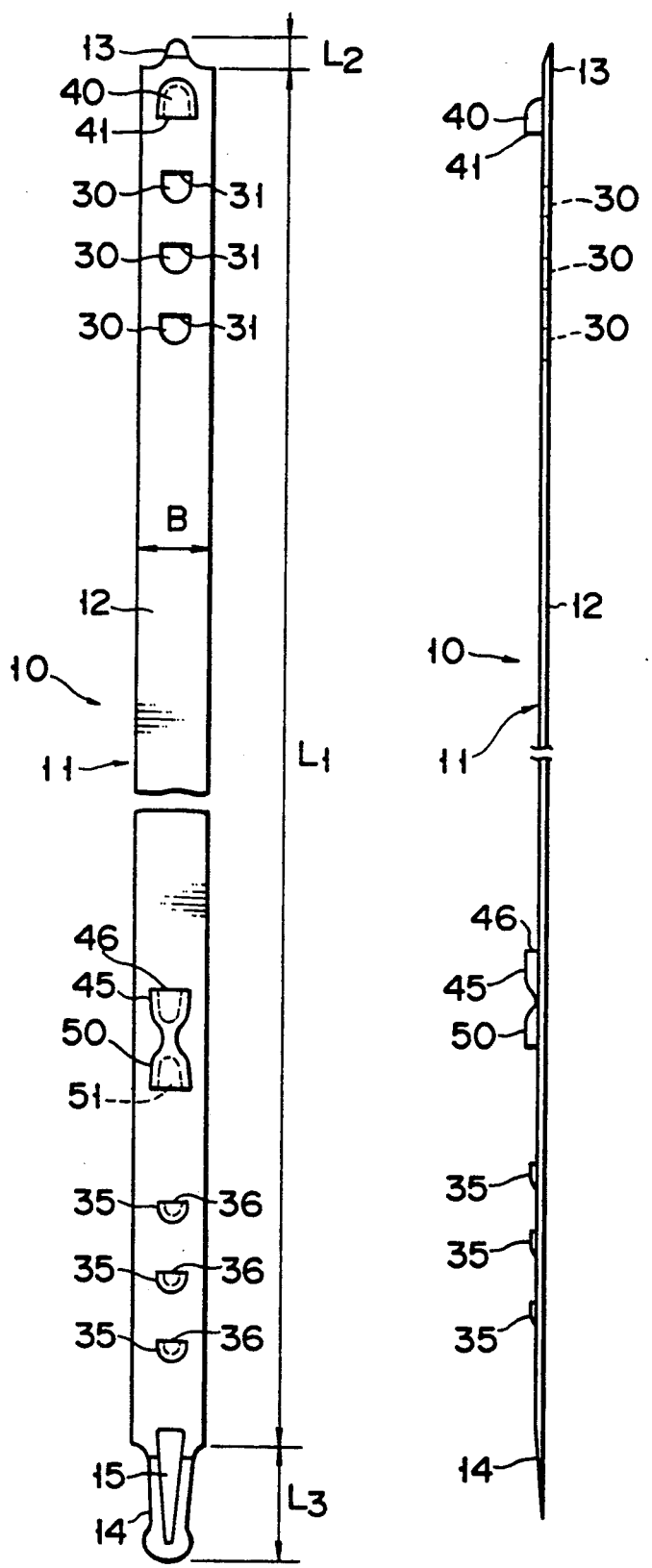
FIG. 6 is an expanded plane of the clamp shown in FIG. 1.
FIG. 7 an expanded side view of the clamp shown in FIG. 1

A clamp 10 comprises a metal band body 11. As shown in FIG. 6, the body 11, in its expanded state, has a main part 12 having a length $L_1$, a first end 13, which is positioned at one end in the longitudinal direction of the main part 12, and which has a length $L_2$, and a second end 14, which is positioned at the other end in the longitudinal direction of the main part 12, and which has a length $L_3$. The body 11 is made of band-like material of stainless steel. The body 11 has appropriate flexibility. The width of the first end 13 is narrower than the width B of the main part 12. As shown in FIG. 7, the first end 13 is taper-shaped such that the thickness is reduced toward the distal end.

The width of the second end 14 is also narrower than the width B of the main part 12, and is taper-shaped such that the thickness is reduced toward the distal end. In the central portion of the second end 14, there is formed a punched hole 15 or a slit, thereby making it possible to easily taper-shape the second end 14 by press working.

The body 11 is wound around the surface to be clamped in order that the second end 14 is positioned inside. Therefore, the body 11 may be C-formed in advance. The body 11, which is formed in a ring-like shape, has an inner lap portion 21, an outer lap portion 22, and an intermediate portion 23, which is connected to portions 21 and 22.

Figure 4:
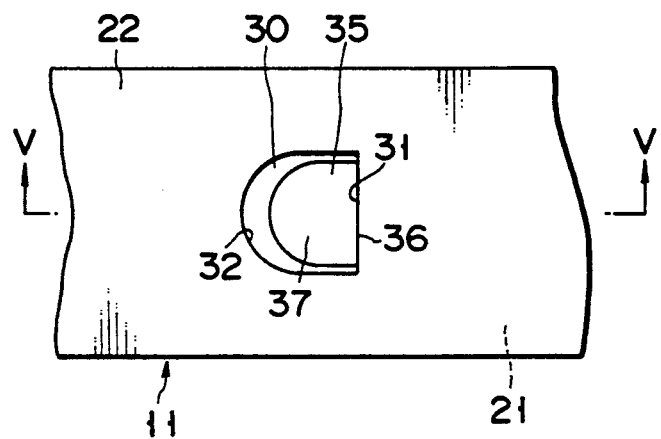
FIG. 4 is a plane showing a projection and a receiving hole of the clamp shown in FIG. 1.

In the outer lap portion 22, there is formed receiving holes 30. As is shown in FIG. 4, each hole 30 is provided with a linear front edge portion 31, which is along the width direction of the body 11, and a semicircular back edge portion 32. The number of receiving holes 30 is decided as required.

Figure 5:
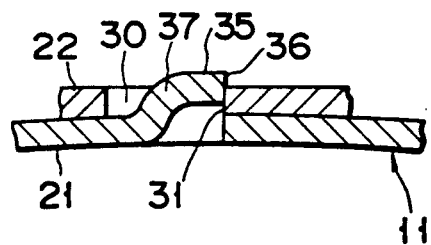
FIG. 5 is a cross sectional view taken on line of V—V in FIG. 4.

Projections 35 are formed on the inner lap portion 21. The projections 35 are pressed to protrude to the outer surface side of the inner lap portion 21, and shaped to enter the receiving hole 30. The respective projections 36 comprises a front surface wall 35, which can be engaged with the edge portion 31 of the receiving hole 30, and an arched protruding portion 37 connected to the back portion of the front surface wall 36. As shown in FIG. 5, the front surface wall 36 substantially vertically rises from the surface of the body 11. The height of the projection 35 is slightly larger than the thickness of the body 11.

Figure 2:
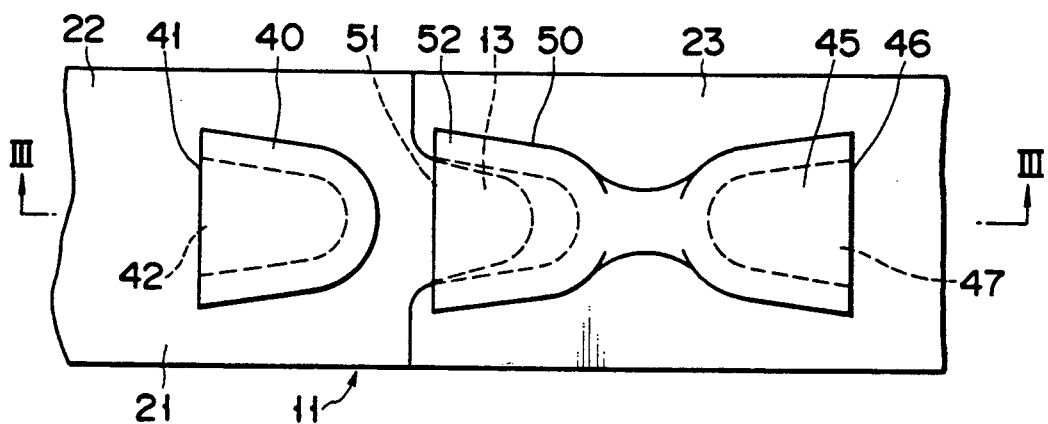
FIG. 2 is a plane showing a clamp of FIG. 1 near a terminal holding portion.
Figure 3:
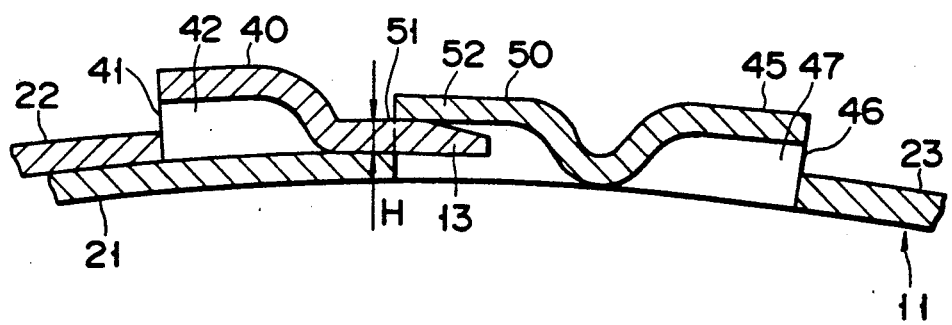
FIG. 3 is a cross sectional view taken on line of III—III in FIG. 2.

As shown in FIGS. 2 and 3, a first tool receiving portion 40 is formed on the outer lap portion 22 of the body 11. The first portion 40 is positioned in the vicinity of the first end 13. The first portion 40 comprises a first rising wall 41, which is directed to the receiving hole 30, and a first opening 42.

Figure 8:
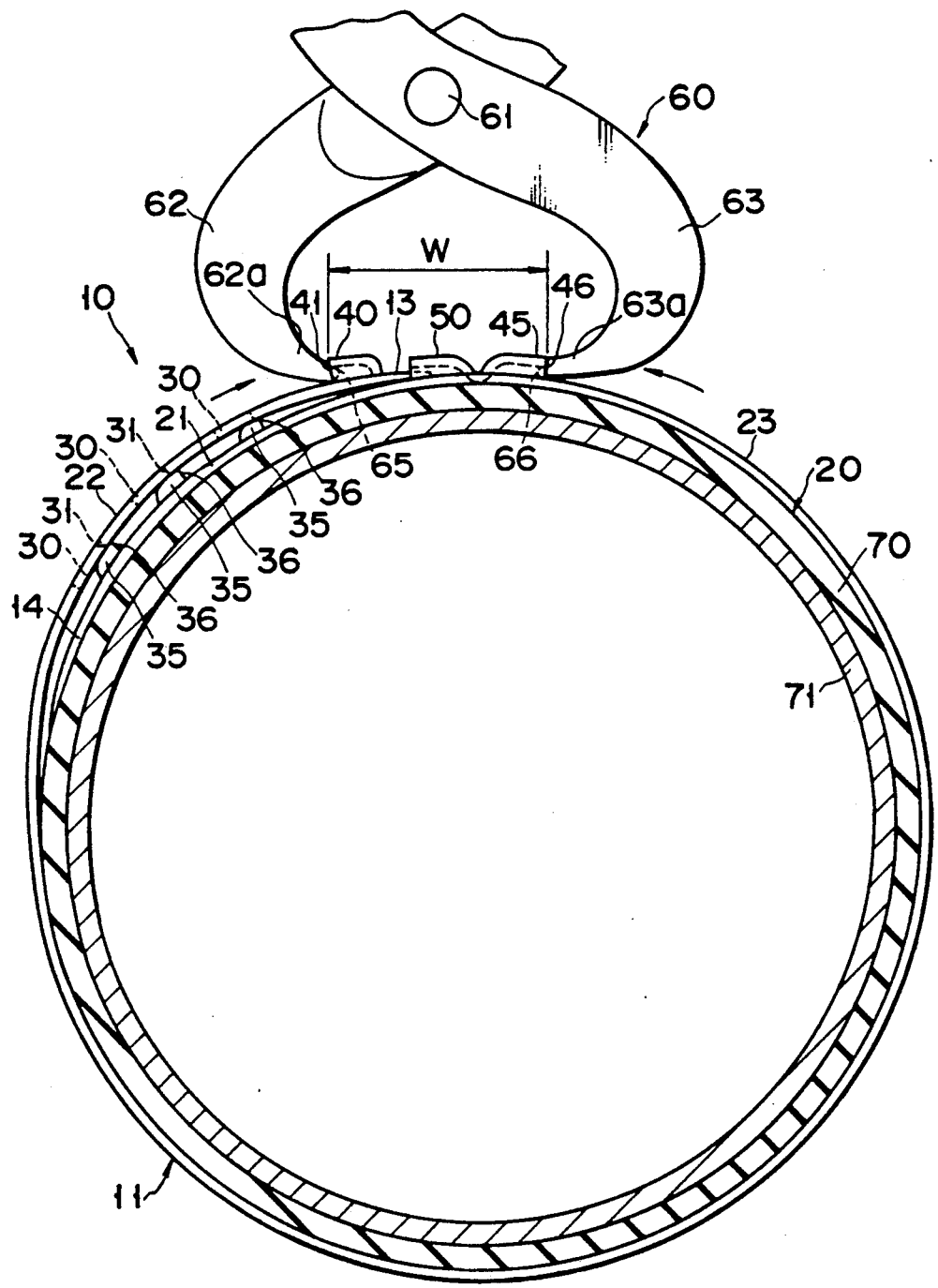
FIG. 8 is a cross sectional view showing a state that the clamp of FIG. 1 is used.

In the intermediate portion 23 of the body 11, there is formed a second tool receiving portion 45. The second portion 45 comprises a second rising wall 46 and a second opening 47. As shown in FIG. 8, the distance W, which is from the rising wall 41 of the first portion 40 to the rising wall 46 of the second portion 45, corresponds to a size in which arm top end portions 62a and 63a of a tool 60 to be explained later can reach the rising walls 41 and 46. The portions 40, 45 are formed by press working.

There is formed a terminal holding portion 50 in the vicinity of the second tool receiving portion 45. The terminal holding portion 50 is positioned between the second tool receiving portion 45 and the projection 35. As shown in FIGS. 2 and 3, an opening 51 and a terminal holding wall 52 are formed in the terminal holding portion 50. The opening 51 has a size in which the first end 13 can be inserted. The opening height of the opening 51, that is, distance H, which is from the surface of the body 11 to the inner surface of the terminal holding wall 52, is slightly larger than the thickness of the body 11. Therefore, the first end 13, which is inserted into the opening 51, is constrained in the direction of the thickness and that of the width by the terminal holding portion 50.

Figure 1:
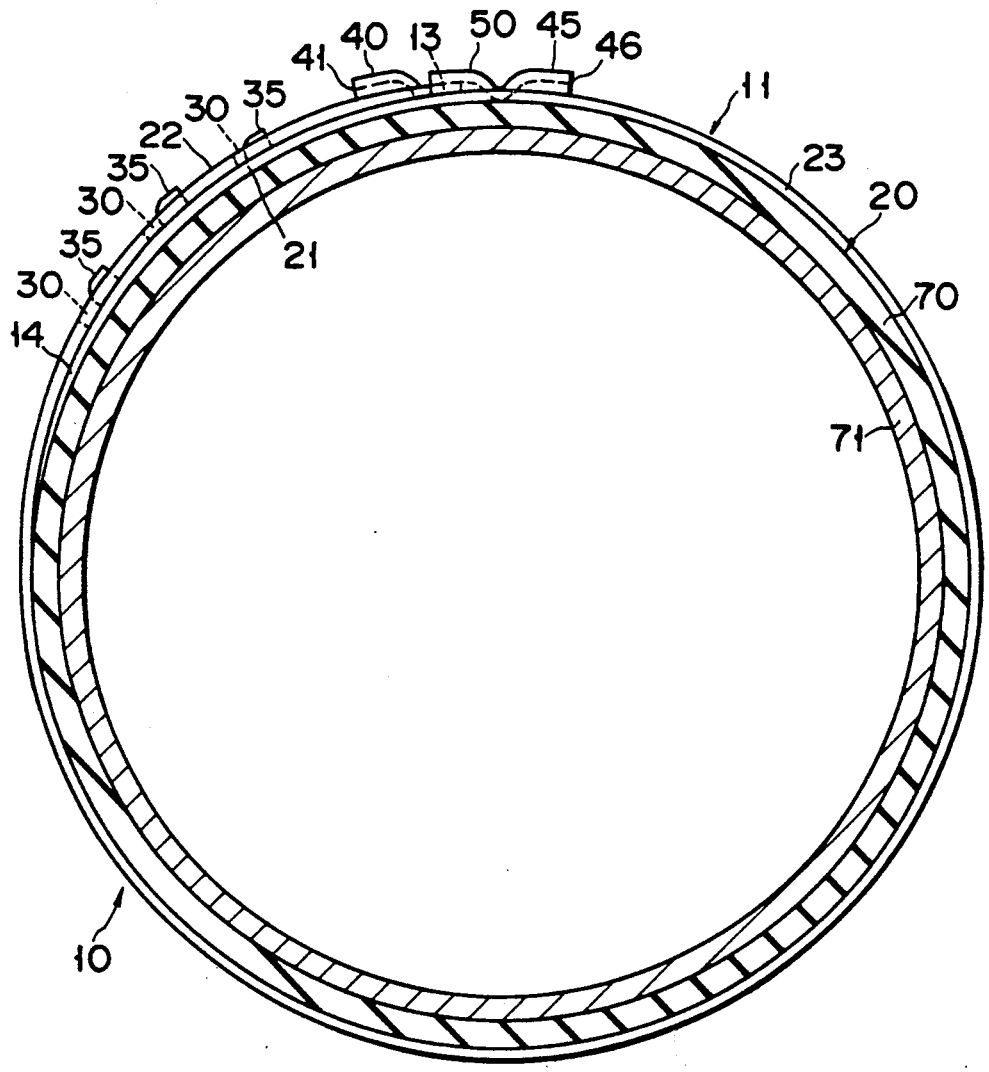
FIG. 1 a cross sectional view showing a state that a clamp of a first embodiment of the present invention is actually fixed to a surface to be clamped.

As shown in FIG. 1, the terminal holding portion 50 is provided at the position where the first end 13 enters the opening 51 in a state that the projection 35 and the receiving hole 30 are engaged with each other. The terminal holding portion 50 is also formed by the press working.

Figure 9:
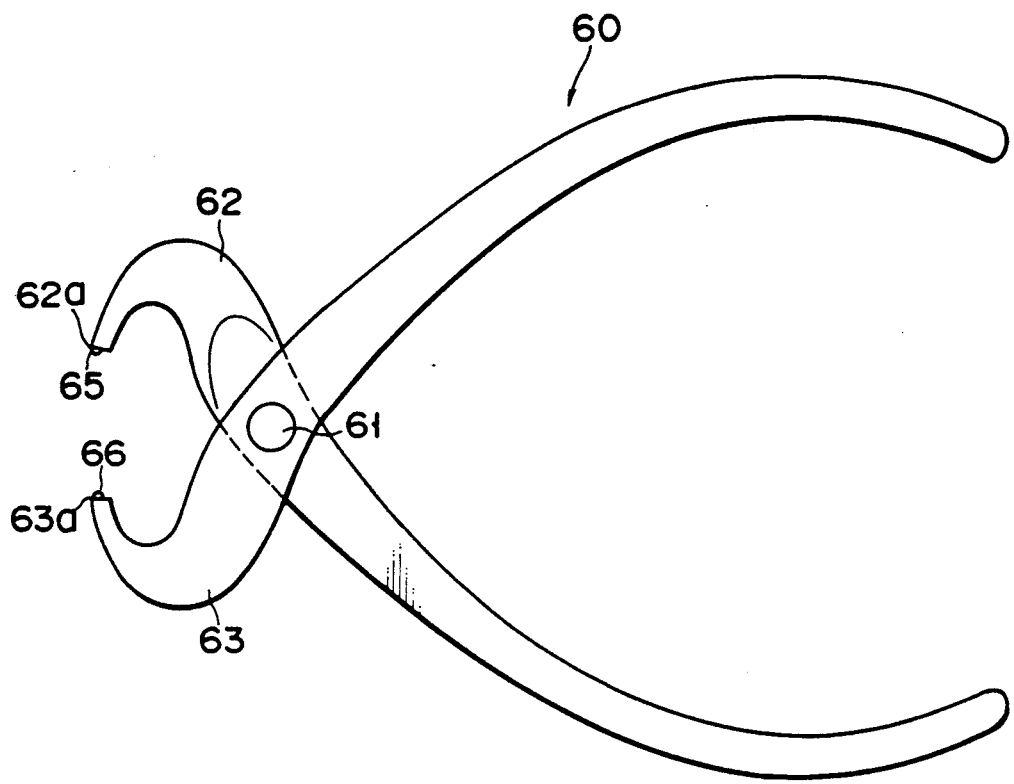
FIG. 9 is a plane of a tool, which is used to fasten the clamp.

As shown in FIGS. 8 and 9, a tool 60 has a pair of arms 62 and 63, which can open and close around a shaft 61 similar to a well-known nipper. There are formed small projections 65 and 66 in the surface opposed to the top portions 62a and 63a of the arms 62 and 63. The shapes and sizes of the small projections 65 and 66 are formed to be just inserted into the openings 42 and 47 of the portions 40 and 45.

An operation of the clamp 10 will be explained as follows:

As shown in FIG. 1, the clamp 10 of this embodiment is used to fix the connecting section of a boot 70 and a pipe 71. The boot 70 is made of rubber, and the pipe 71 is made of metal. However, the boot 70 and pipe 71 may be made of synthetic resin.

As shown in FIG. 8, the clamp 10 is wound around the outer surface of the connecting section. The arm top end portions 62a and 63a of the tool 60 are engaged with the portions 40 and 45, thereafter, the portions 40 and 45 are pulled toward the direction (arrow direction shown in FIG. 8) where both portions are close to each other by the tool 60. At this time, the first end 13 enters the opening 51 of the terminal holding portion 50.

When the body 11 is fastened for a predetermined amount by the tool 60, the projection 35 is inserted into the receiving hole 30 as shown in FIG. 1. Due to this, as shown in FIGS. 4 and 5, the front surface wall 36 of the projection 35 is engaged with the edge portion 31 of the receiving hole 30. Moreover, as shown in FIGS. 2 and 3, the first end 13 enters the terminal holding portion 50, thereby the first end 13 is constrained. Therefore, the outer lap portion 22 is not separated from the inner lap portion 21. Since the projection 35, which is inserted into the receiving hole 30, is completely restrained, there is no possibility that the projection 35 will be detached from the receiving hole 30.

As shown in FIG. 5, the front surface wall 36 of the projection 35 vertically rises from the surface of the body 11. Due to this, when the projection 35 is inserted into the receiving hole 30, the body 11 does not move in the direction where the body 11 is loosened. For this reason, suitable clamping force can be maintained.

Figure 10:
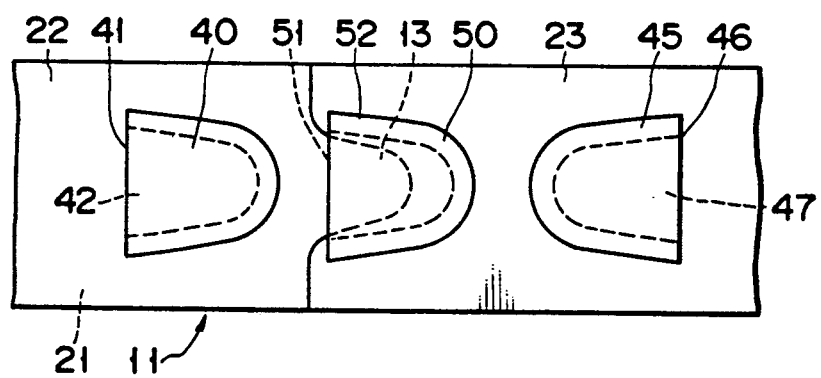
FIG. 10 is a plane showing a modification of a terminal holding portion.

Additionally, as shown in FIG. 10, the terminal holding portion 50 and the tool receiving portion 45 may be separated from each other. Also, in the terminal holding portion 50, a part, which is constituted separately from the body 11, may be fixed to the body 11 by suitable fixing means. Or, the terminal holding portion 50 and the tool receiving portion 50 may be integrally formed.

FIGS. 11 to 18 show a second embodiment of the present invention. In the second embodiment, the same reference numerals as those of the first embodiment are added to the portions, which are common to the first embodiment, and the explanation thereof will be omitted. The following explains the portions which are different from those of the first embodiment.

Figure 11:
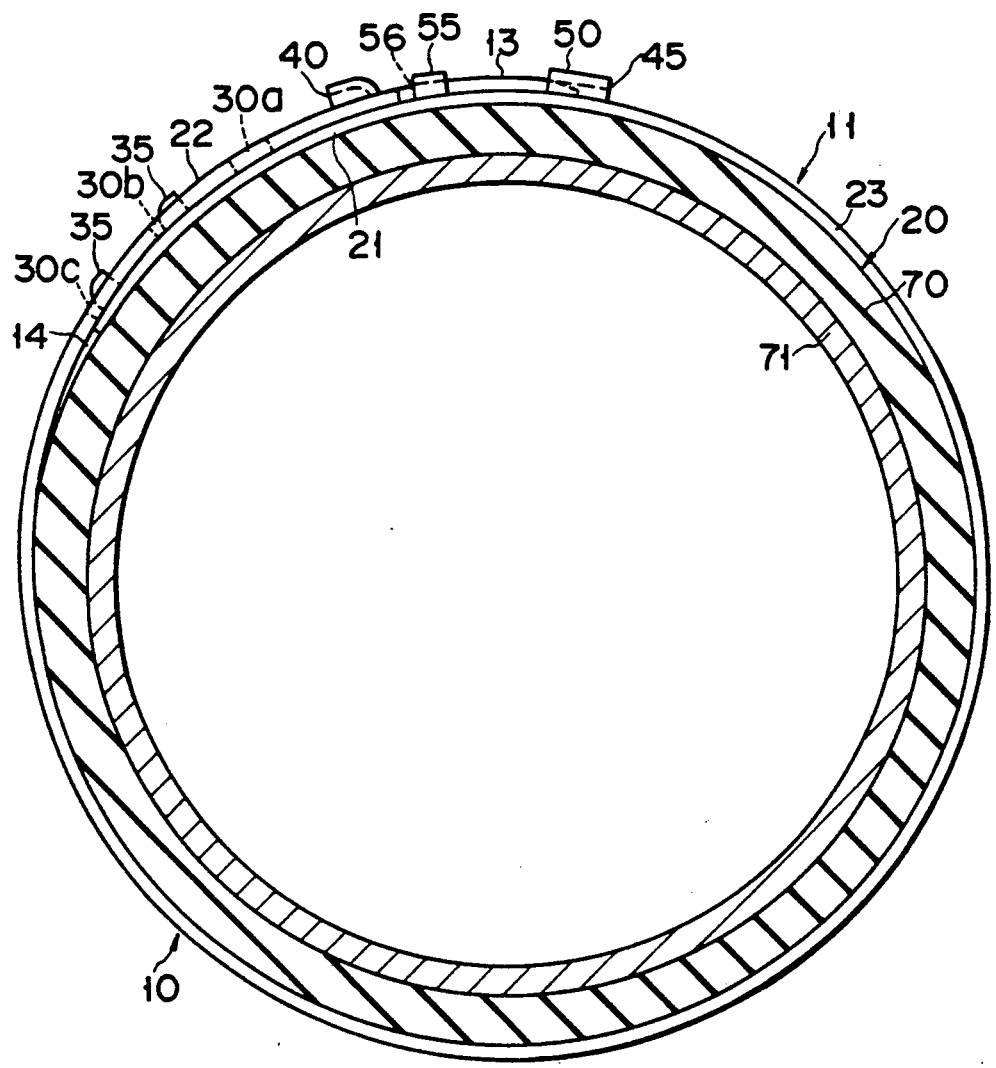
FIG. 11 is a cross section showing a state that the clamp of a second embodiment of the present invention is actually fixed to a surface to be clamped.

As shown in FIG. 11, in the outer lap portion 22, there are formed receiving holes 30a, 30b, and 30c. The number of projections 35 is smaller than that of receiving holes 30a to 30c by one. In the terminal holding portion 50 formed by the press working, there are formed the opening 51 and the rising wall 46 of the second tool receiving portion 45.

There is formed a passage portion 55, which is an example of temporarily attaching means between the terminal holding means 50 and the projection 35. The passage portion 55 has a hole 56, which is along the longitudinal direction of the body 11. The size of the hole 56 is set so that the first end 13 can be passed therethrough. The first end 13 is inserted into the passage portion 55 when the body 11 is formed in a ring-like shape to some extent, that is, before the projections 35 are inserted to the receiving holes 30b and 30c.

Figure 18:
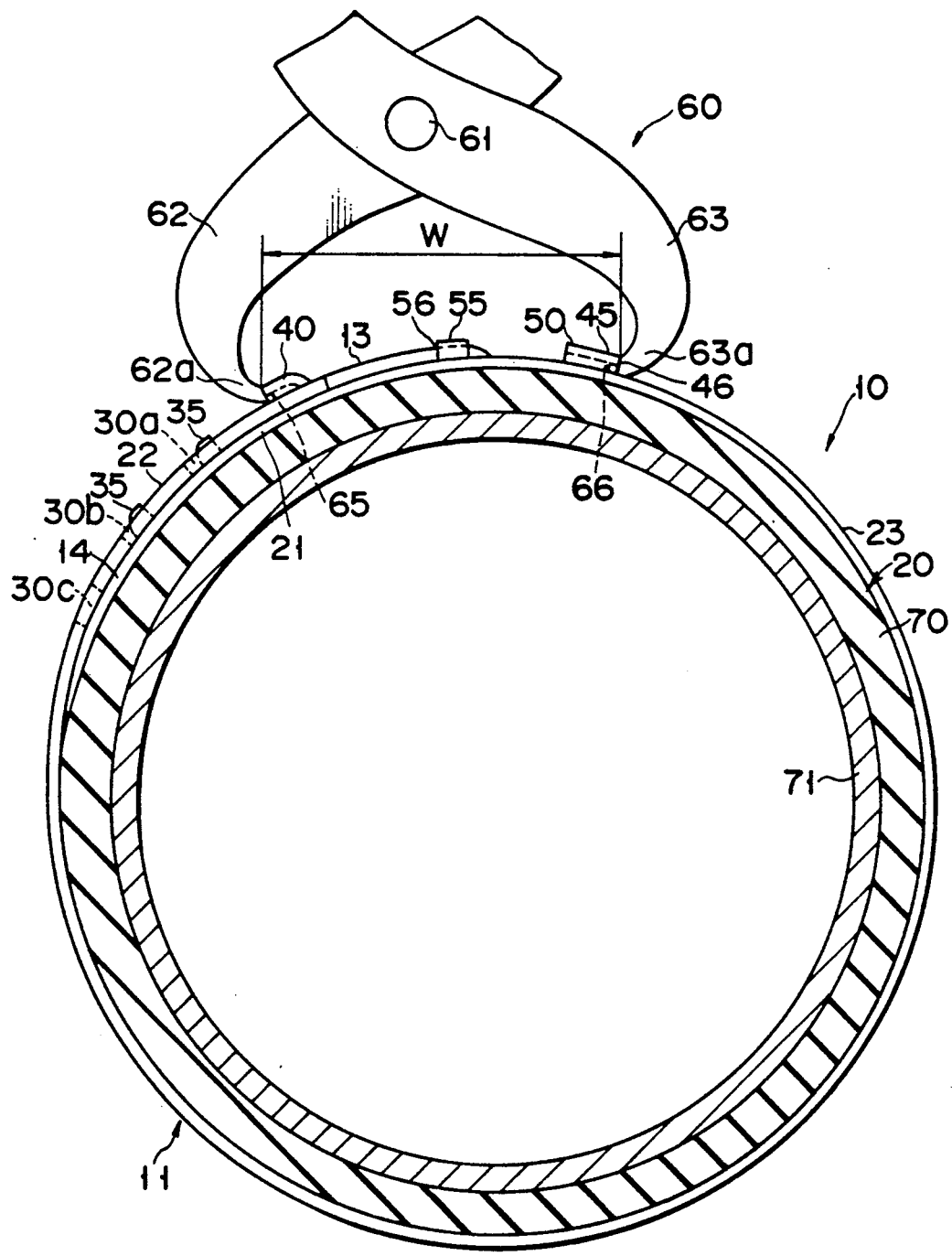
FIG. 18 is a cross sectional view showing a state that the tool is used.

As shown in FIG. 18, the clamp 10 is wound around the outer surface of the connecting section of the boot 70 and the pipe 71. When the clamp 10 is temporarily attached to the surface to be clamped, the first end 13 is passed through the hole 56 of the passage portion 55, thereafter, the projections 35 are inserted into the first receiving hole 30a and the second receiving hole 30b.

In order to fix the clamp 10 to the surface of the connecting section, the arm top ends 62a and 63a of the tool 60 are engaged with the tool receiving portions 40 and 45, and the portions 40 and 45 are pulled toward the direction where both portions are close to each other by the tool 60. At this time, the first end 13 straightly advances toward the opening 51 of the terminal holding portion 50 while being guided by the passage portion 55.

As shown in FIG. 11, when the body 11 is fastened for a predetermined amount, the projections 35 are inserted into the second and third receiving holes 30b and 30c. Due to this, as shown in FIGS. 14 and 15, the front surface wall 36 of the projection 35 is engaged with the edge portion 31 of the receiving holes 30b and 30c. Moreover, as shown in FIGS. 12 and 13, the first end 13 enters the terminal holding portion 50, thereby the first end 13 is completely restrained.

FIGS. 19 to 28 show a third embodiment of the present invention. In the third embodiment, the same reference numerals as those of the above-mentioned embodiments are added to the portions, which are common to the above-mentioned embodiments, and the explanation thereof will be omitted. The following explains the portions which are different from those of the above-mentioned embodiments.

As shown in FIG. 22, a hook 75 is provided between the terminal holding portion 50 and the projection 35. A distal end 75a of the hook 75 is directed to the terminal holding portion 50. A back portion 75b of the hook 75 is rounded to same extent.

There is formed a through hole 77 between the receiving hole 30a and the tool receiving portion 40. In the front edge of the through hole 77, there is formed a hook receiving portion 78 which can engage with the distal end 75a of the hook 75. As shown in FIG. 23, the hook receiving portion 78 is thicker than the body 11.

The hook 75 and the hook receiving portion 78 ar placed at the position where they are engaged with each other in a temporarily attaching state that the body 11 is wound to some extent. The hook 75 is formed by the press working. The hook 75 and the hook receiving portion 78 constitute temporarily attaching means 79. Additionally, the hook 75 may be formed on the outer lap portion 22 and the receiving portion 78 may be formed in the inner lap portion 21.

Figure 19:
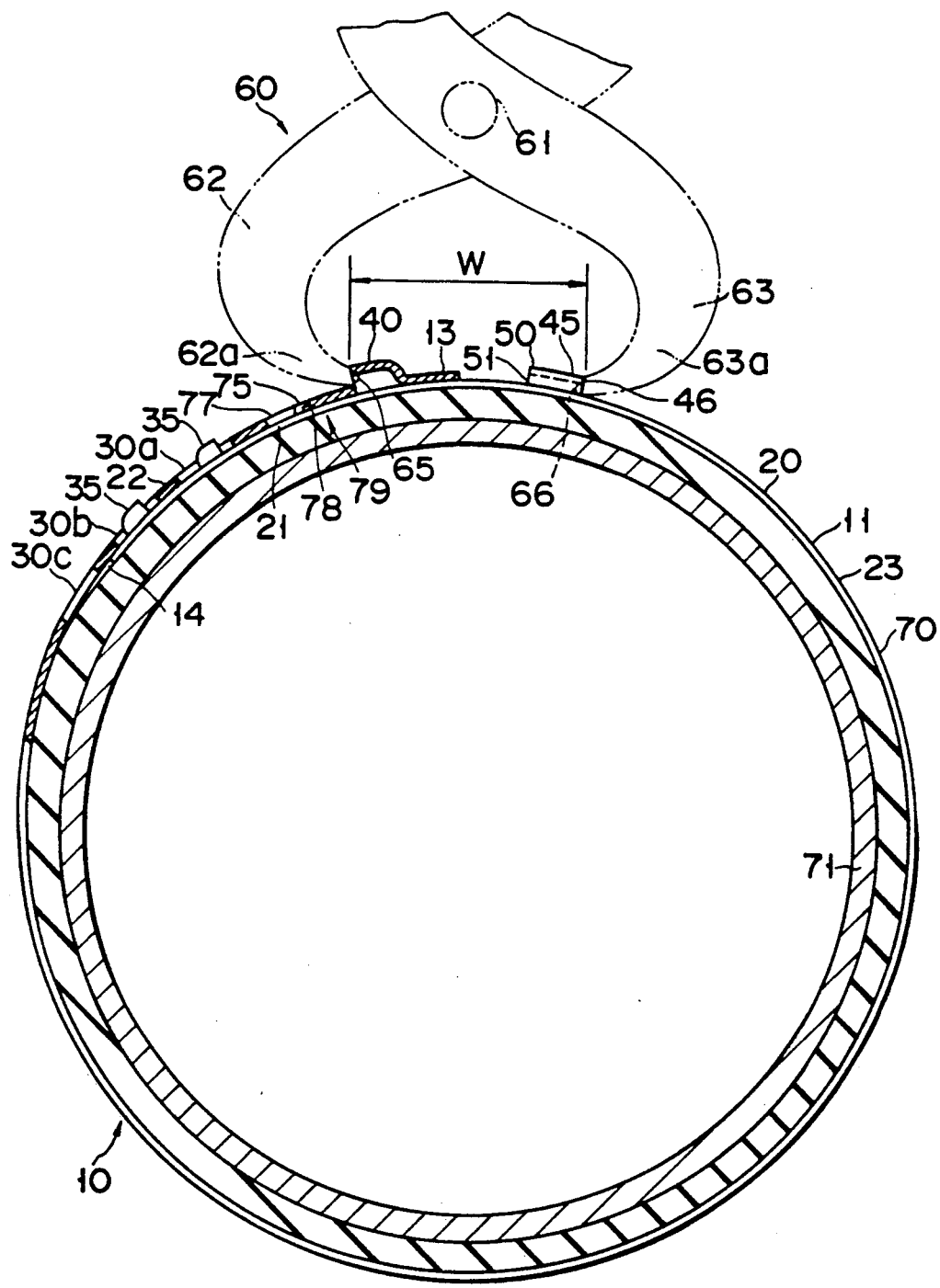
FIG. 19 is a front view in which a temporarily attaching state of a clamp of a third embodiment of the present invention is shown partially by a cross section.
Figure 24:
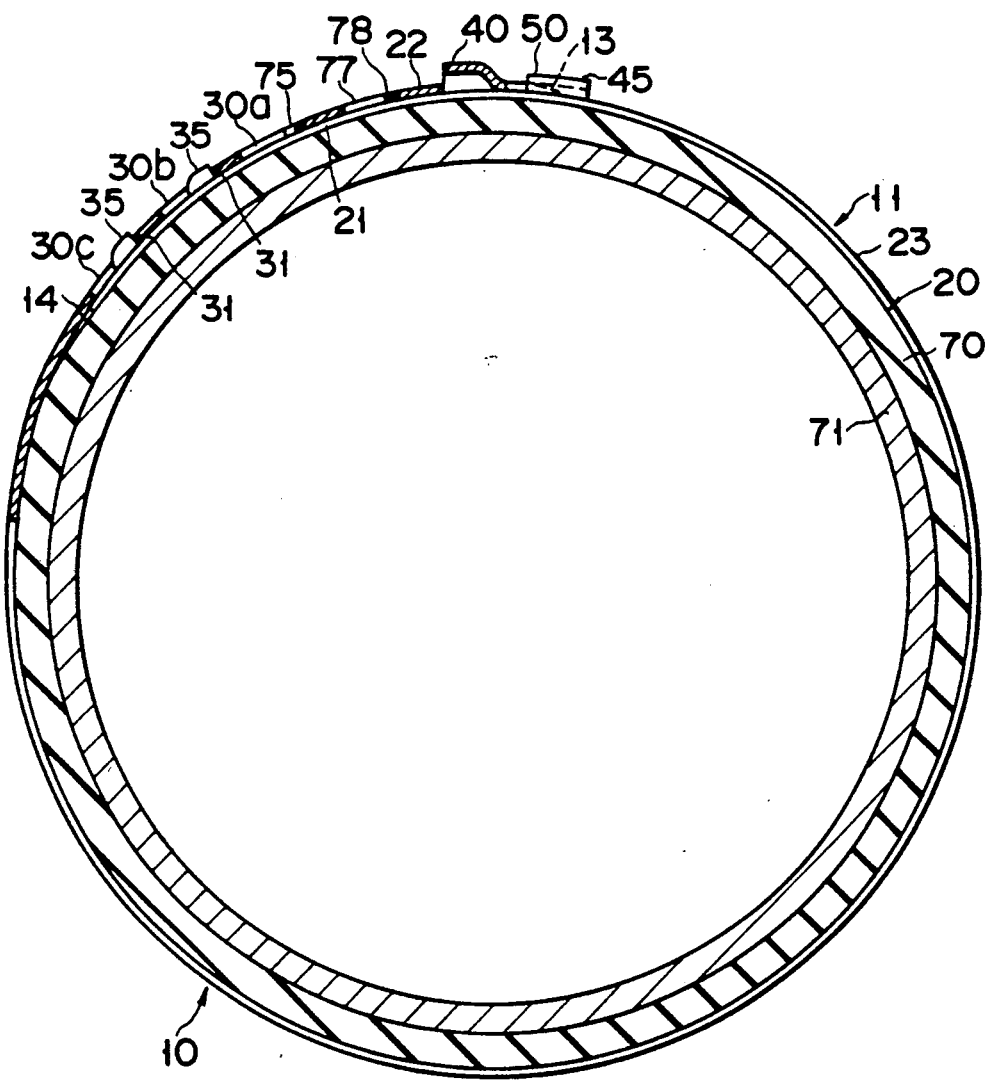
FIG. 24 is a front view showing, partially by a cross section, a fixing state of the clamp in FIG. 19 to the surface to be clamped.

As shown in FIG. 19, the hook 75 is engaged with the hook receiving portion 78 at the time of temporarily attaching. The engagement of the hook 75 with the receiving portion 78 can be maintained by spring back force of the body 11. At the time of temporarily attaching, the projections 35 enter the first and second receiving holes 30a and 30b.

If the tool receiving portions 40 and 45 are pulled toward the direction where both receiving portions are close to each other by the tool 60, the first end 13 advances toward the opening 51 of the terminal holding portion 50. The back portion 75b of the hook 75 relatively moves in the direction of the first receiving hole 30a while being sliding on the back surface of the outer lap portion 22. Finally, the hook 75 enters the receiving hole 30a.

Figure 25:
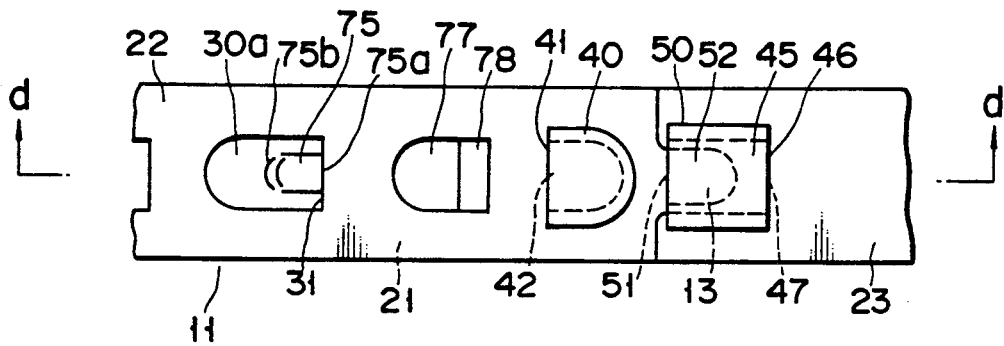
FIG. 25 is a plane showing the clamp of FIG. 19 near the terminal holding portion.
Figure 26:
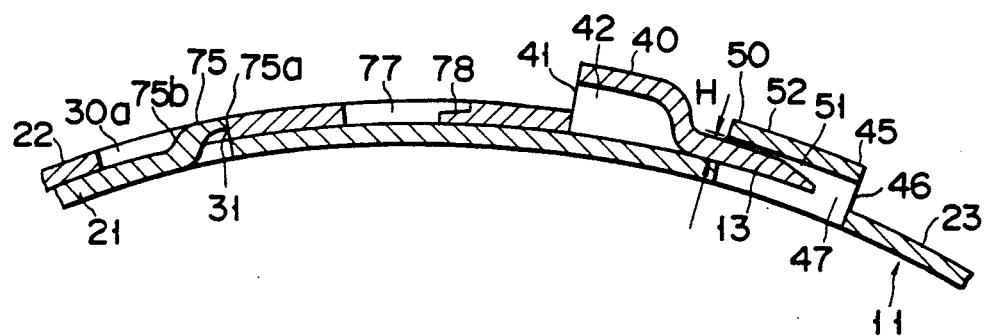
FIG. 26 is a cross sectional view taken on line of d—d in FIG. 25.
Figure 27:
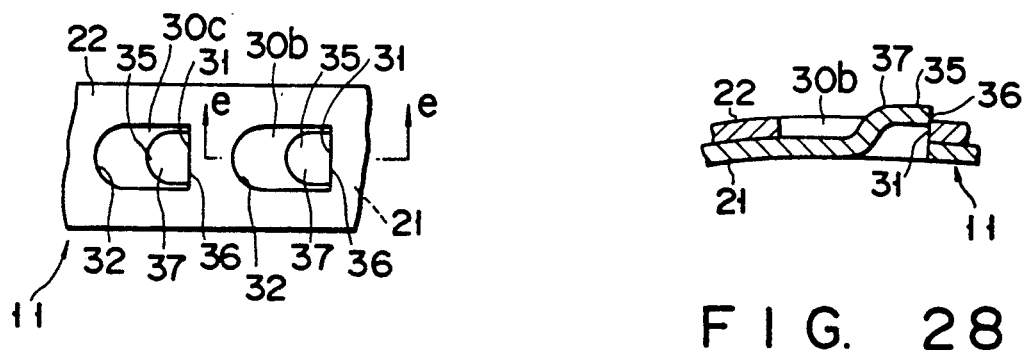
FIG. 27 is a plane showing a projection and a receiving hole of the clamp shown in FIG. 19.
Figure 28:
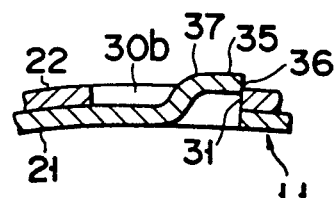

As shown in FIGS. 24 to 28, if the body 11 is fastened for a predetermined amount by the tool 60, the projections 35 are inserted into the first and second receiving holes 30b and 30c, and the the projections 35 are engaged with the edge portions 31 respectively. In the real fixing state, as shown in FIGS. 25 and 26, the distal end of the first end 13 enters the terminal holding portion 50, thereby the first end 13 is constrained.

FIGS. 29 and 30 show a fourth embodiment of the present invention. In the fourth embodiment, since the basic structure and the operation are the same as the above-mentioned third embodiment, the same reference numerals as those of the above-mentioned embodiments are added to the portions, which are common to the above-mentioned third embodiment, and the explanation thereof will be omitted. The following explains the portions which are different from those of the above-mentioned embodiments.

As shown in FIG. 29, in the second end 14 of the body 11, there is provided a pair of terminal pieces 14a and 14b extending in the longitudinal direction of the body 11. As shown in FIG. 30, the paired terminal pieces 14a and 14b are formed such that the tips thereof are tapered by a press working. A slit 80 is formed between the paired terminal pieces 14a and 14b.

In the back edge portion of the receiving holes 30a, 30b, and 30c, a chamfered inclination guide surface 81 is formed. Thereby, the projections 35 can easily move toward the second and third receiving holes 30b and 30c when the body 11 is actually fixed from the temporary attaching state. Moreover, in the back edge portion of the through hole 77 for the temporary attaching, there is formed a chamfered inclination guide surface 82. Thereby, the hook 55 can easily move toward the first receiving holes 30a when the body 11 is actually fixed from the temporary attaching state.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A clamp structure mountable on a surface to be clamped by using a tool having a pair of openable arms, said clamp structure comprising:

a metal band body having a main portion, and a first end and a second end at respective opposite ends of said main portion, said metal band body being fastenable into a ring-like form such that said second end is located inside said first end, said metal band body in said fastened form having an inner lap portion, an outer lap portion overlying said inner lap portion and an intermediate portion connected to both said inner and outer lap portions;

a projection formed on said inner lap portion to project toward said outer lap portion, said projection having a front surface wall directed toward said first end of said metal band body;

a receiving hole formed in said outer lap portion, said receiving hole having a front edge portion engageable with said front wall surface of said projection formed on said inner lap portion;

a first tool receiving portion formed near said first end of said metal band body and having a first rising wall;

a second tool receiving portion formed on said intermediate portion of said metal band body and having a second rising wall, said second tool receiving portion being paired with said first tool receiving portion;

a terminal holding portion on said inner lap portion for engaging and holding said first end of said metal band body, said terminal holding portion having a terminal holding wall for engaging and holding portion having a terminal holding wall for engaging and holding said first end to prevent said first end from being separated from said inner lap portion when said projection formed on said inner lap portion is inserted into said receiving hole formed in said outer lap portion to fasten said metal band body, and said terminal holding portion having an opening, facing said first end when said metal band body is not fastened, for receiving said first end when said metal band body is in said fastened form; and temporary attaching means for temporarily attaching said metal band body by constraining said outer and inner portions to be engaged with each other when said metal band body is being fastened into said ring-like form, said temporary attaching means comprising a passage portion provided between said terminal holding portion and said projection formed on said inner lap portion, said passage portion having an opening through which said first end of said metal band body can pass therethrough, said opening being provided along the longitudinal direction of said metal band body.

2. The structure according to claim 1, wherein said opening in said passage portion and said opening in said terminal holding portion lie along a same line extending in the longitudinal direction of said metal band body.

3. A structure according to claim 1, wherein the width of said first end of said metal band body is narrower than the width of said main portion of said metal band body.

4. The structure according to claim 1, wherein said temporary attaching means comprises a hook extending from an outer surface of said inner lap portion of said metal band body, and a receiving portion which is formed in said outer lap portion and which is engageable with said hook.

5. The structure according to claim 1, wherein said front wall surface of said projection rises substantially vertically from a surface of said inner lap portion.

6. The structure according to claim 1, wherein a chamfered inclination guide surface is formed on a back edge portion of said receiving hole such that said projection can easily move toward the direction of the receiving hole when said metal band body is fastened.

7. The structure according to claim 1, wherein a pair of terminal pieces extending in the longitudinal direction of said metal band body are formed on the second end of said metal band body, each of said terminal pieces being tapered by press working.

8. A clamp structure mountable on a surface to be clamped by using a tool having a pair of openable arms, said clamp structure comprising;
 a metal band body having a main portion, and a first end and second end at respective opposite ends of said main portion, said metal band body being fastenable into a ring-like form such that said second end is located inside said first end, said metal band body in said fastened form having an inner lap portion, an outer lap portion overlying said inner lap portion, and an intermediate portion connected to both said inner and outer lap portions;
 a projection formed on said inner lap portion and projecting toward said outer lap portion, said projection having a front wall surface directed toward said first end of said metal band body, said front wall surface rising substantially vertically from a surface of said inner lap portion;
 a receiving hole formed in said outer lap portion, said receiving hole having a front edge portion engageable with said front wall surface of said projection formed on said inner lap portion to prevent said metal band body from sliding in a backwards direction to be loosened;
 a first tool receiving portion formed near said first end of said metal band body and having a first rising wall;
 a second tool receiving portion formed on said intermediate portion of said metal band body and having a second rising wall, said second tool receiving portion being paired with said first tool receiving portion; and
 a terminal holding portion on said inner lap portion for engaging and holding said first end of said metal band body, said terminal holding portion having a terminal holding wall for engaging and holding said first end to prevent said first end from being separated from said inner lap portion when said projection formed on said inner lap portion is inserted into said receiving hole formed in said outer lap portion to fasten said metal band body, and said terminal holding portion having an opening, facing said first end when said metal band body is not fastened, for receiving said first end when said metal band body is in said fastened form.

9. A structure according to claim 8, wherein the width of said first end of said metal band body is narrower than the width of said main portion of said metal band body.

10. A structure according to claim 8, wherein said terminal holding portion is formed by pressing a portion of said main portion of said metal band body outward by press working.

11. A structure according to claim 8, wherein said second rising wall of said second tool receiving portion is formed in said terminal holding portion.

* * * * *